US005481732A

United States Patent [19]
Shahbazi

[11] Patent Number: 5,481,732
[45] Date of Patent: Jan. 2, 1996

[54] CRT MONITOR POWER CONTROL UNIT

[76] Inventor: Horyeh D. Shahbazi, 1 Driftwood, Irvine, Calif. 92714

[21] Appl. No.: 166,043

[22] Filed: Dec. 14, 1993

[51] Int. Cl.⁶ .............................. G06F 1/32; G06F 3/14
[52] U.S. Cl. .................. 395/750; 345/212; 364/273.1; 364/273.2; 364/273.3; 364/231; 364/DIG. 1; 364/237.3; 364/707
[58] Field of Search .......................... 395/750; 364/707; 348/173; 377/16; 371/14; 345/212

[56] References Cited

U.S. PATENT DOCUMENTS

| | | | |
|---|---|---|---|
| 3,836,813 | 9/1974 | Chambers | 395/750 |
| 3,941,989 | 3/1976 | McLaughlin et al. | 364/707 |
| 4,409,665 | 10/1983 | Tubbs | 364/707 |
| 4,417,135 | 11/1983 | Motoyama et al. | 377/18 |
| 4,665,536 | 5/1987 | Kim | 377/16 |
| 4,722,005 | 1/1988 | Ledenbach | 348/173 |
| 4,922,448 | 5/1990 | Kunieda et al. | 395/750 |
| 4,980,836 | 12/1990 | Carter et al. | 364/483 |
| 5,163,124 | 11/1992 | Yabe et al. | 395/750 |
| 5,167,024 | 11/1992 | Smith et al. | 395/375 |
| 5,335,168 | 8/1994 | Walker | 364/707 |
| 5,375,245 | 12/1994 | Solhjell et al. | 395/750 |

Primary Examiner—Gopal C. Ray
Attorney, Agent, or Firm—Plante and Strauss

[57] ABSTRACT

There is disclosed a control unit for the electrical power supply to a CRT monitor used with a personal computer. The unit has electrical power input and output connections, at least one user input for a computer peripheral such as a keyboard or a mouse and outputs to the central computer unit. The power control unit has an electrical switching circuit which, preferably, is a zero-crossing switching circuit to ensure that the switching of the power supply to the computer monitor does not damage internal parts such as the cathode ray tube of the monitor. The electrical switching circuit is controlled by timing, latching and user activity detection circuits in the power control unit.

18 Claims, 3 Drawing Sheets

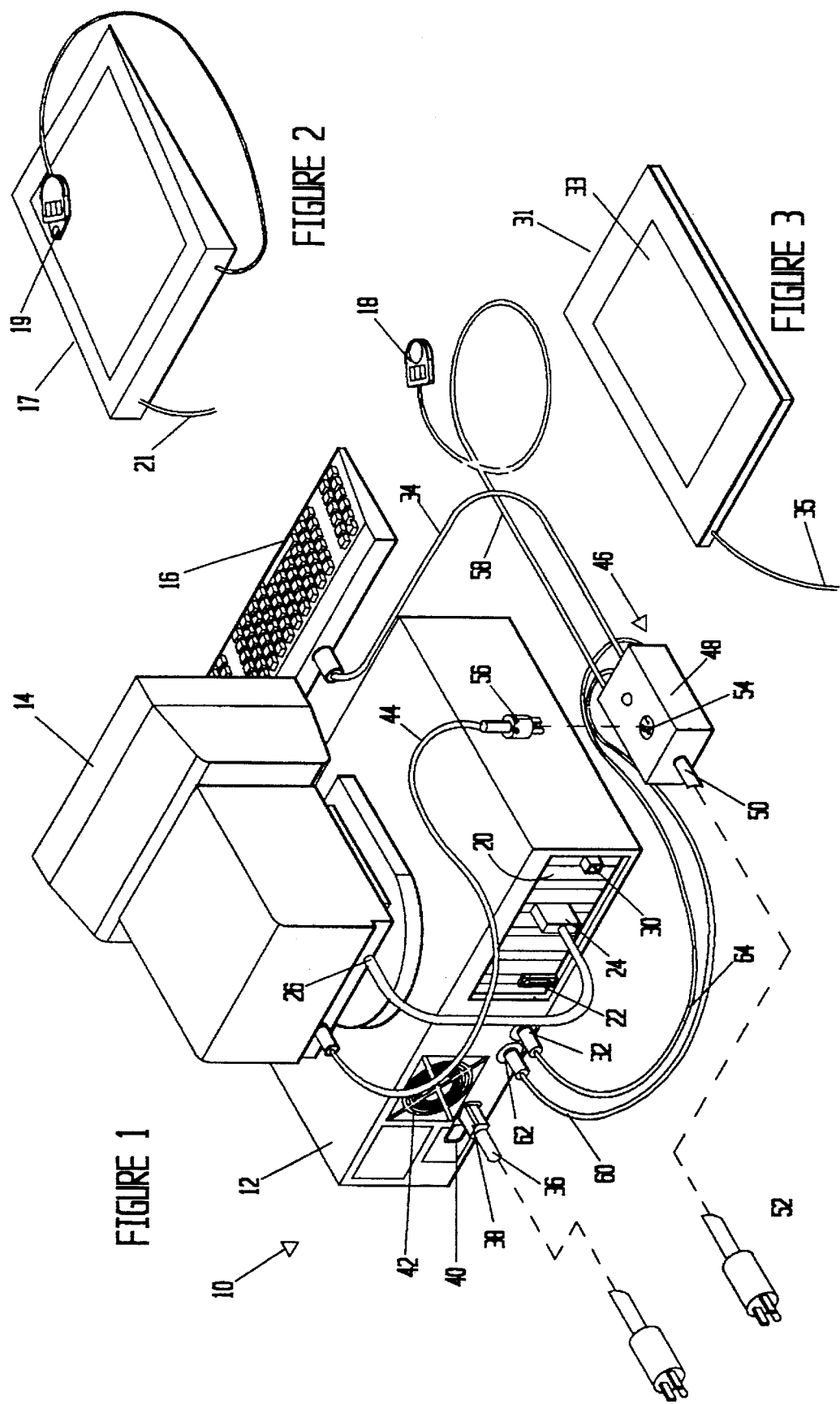

CRT MONITOR POWER CONTROL UNIT

BACKGROUND OF THE INVENTION

1. Field of Invention

This invention relates to a power-saving device and, in particular, to a device for interrupting the power supply to a computer monitor when the computer is not being used.

2. Brief Statement of the Prior Art

The concern for efficient utilization of resources, in particular, attempts to avoid unnecessary power consumption, have focused recently on the substantial amount of electrical power consumed by computers. The fastest expanding use of electrical energy is in office equipment and personal computers represent approximately 5–10% of the annual power consumption office equipment. Advances have been made in controlling the power supply to the central processing unit of computers. These various control circuits have been applied to save battery power in portable computers. The typical office computer, however, utilizes a cathode ray tube (CRT) monitor which is usually powered independently of the power supply to the central computer unit. Heretofore, no attempt has been made to provide a control device which will interrupt the power supply to a computer monitor during periods of inactivity of the computer. Since a typical CRT monitor has a power consumption of about 100 watts, the monitors represent approximately 40–60% of the total power consumption of an office computer. It has been estimated that a computer monitor is only in use approximately 20% of the time that it receives power. Despite the high power consumption by CRT monitors, prior efforts to control power to computers have not addressed the power consumed by these monitors.

There are also software products which are intended to prevent "burn-out" of CRT monitors which results when the screen display on a monitor is unchanged for prolonged periods of time. These products blank the screen, or cause display of changing images. The software does not, however, conserve energy as most of these products result in approximately 20% more energy consumption than a blank screen on the monitor.

Various attempts have been made to interrupt the power supply to computers and related instruments. U.S. Pat. No. 4,665,536 discloses a power interruption unit for a workstation. While this device is suitable for workstation applications, it is not useful for most computer systems as its operation results in a complete loss of data in memory at the workstation. Additionally, since the workstations of various manufacturers have different operating systems, this device must be programmed individually for each manufacturer's workstation product, typically by specialized driver software. Thus, the unit is not universally applicable.

U.S. Pat. Nos. 4,419,917 and 4,463,646 disclose power-saving devices for use with electronic musical instruments such as electronic organs and pianos. U.S. Pat. No. 4,417,135 discloses a power-saving device for a tape recorder. U.S. Pat. No. 4,698,748 discloses a device which provides a sleep control for a computerized automotive control system. U.S. Pat. No. 4,825,143 discloses a power-saving device for use with a multimeter to deactivate its digital display and extend the battery life. U.S. Pat. No. 4,780,843 discloses a power control to the sub-system of a complex data processing system. U.S. Pat. No. 4,455,623 discloses a control to save battery power by reducing the power drain of a microprocessor of a portable computer. U.S. Pat. No. 4,667,289 discloses a power control unit which shuts off power to independently powered peripheral devices when the computer is shut off. U.S. Pat. No. 5,182,810 discloses a low power standby control for a microprocessor used in a battery powered portable computer.

Heretofore, there has been no control system devised specifically for controlling the power to a CRT monitor which will interrupt the electrical power supply to the monitor during periods of inactivity of the computer.

OBJECTIVES OF THE INVENTION

It is an objective of this invention to conserve natural resources by reducing consumption of electrical energy by computer systems.

It is a further object of this invention to provide a device to interrupt the electrical power supply to CRT monitors during periods of inactivity of personal computers.

It is a further object to provide a device which automatically restores electrical power supply to the computer monitor once activity is resumed on the computer.

It is an additional objective of this invention to provided a control device which senses inactivity of the computer.

It is likewise an objective of this invention to provide a control device having a user adaptable variable time delay after inactivity on the computer and before interruption of the electrical power supply to the CRT monitor.

Other and related objectives will be apparent from the following description of the invention.

BRIEF DESCRIPTION OF THE INVENTION

This invention is a control unit for the electrical power supply to a CRT monitor used with a computer system, particularly with a personal computer. The unit has electrical power input and output connections, at least one user input for a computer peripheral such as a keyboard or a mouse and outputs to the central computer unit. The power control unit has an electrical switching circuit which, preferably, is a zero-crossing switching circuit to ensure that the switching of the power supply to the computer monitor does not damage internal parts such as the cathode ray tube of the monitor. The electrical switching circuit is controlled by timing, latching and user activity detection circuits in the power control unit.

BRIEF DESCRIPTION OF THE DRAWINGS

The invention will be described with reference to the figures, of which:

FIG. 1 is a perspective view of a personal computer system with the CRT monitor power control unit of the invention;

FIG. 2 is a perspective view of a digitizing tablet which can be used with the computer system of FIG. 1;

FIG. 3 is a perspective view of a hand-writing recognition tablet which can be used with the computer system of FIG. 1;

DESCRIPTION OF THE PREFERRED EMBODIMENT

Figure 4:
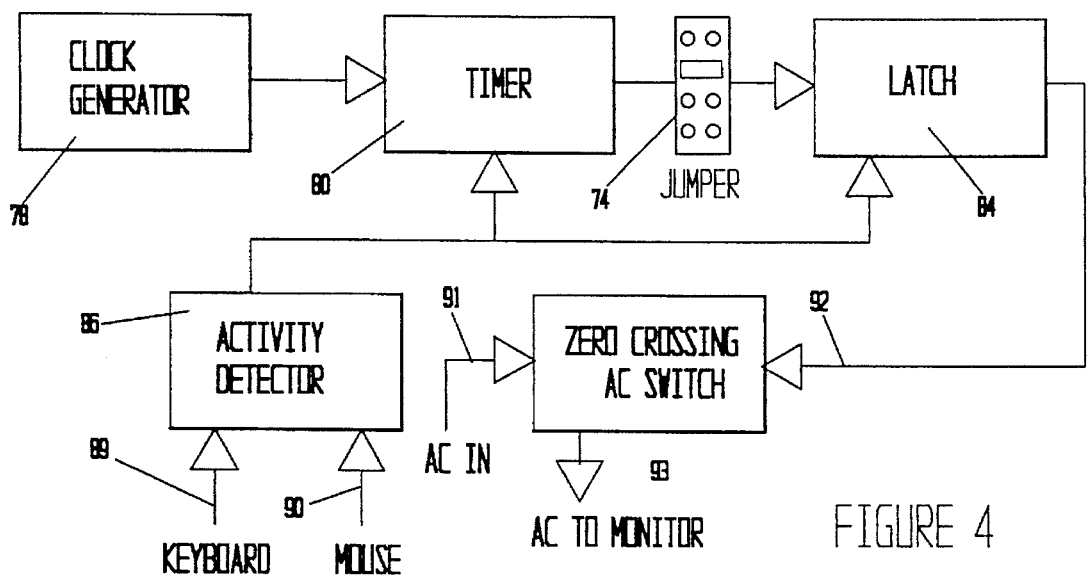
FIG. 4 is a block diagram of the power control unit of the invention.

Referring to FIG. 1, there is illustrated a typical desktop personal computer system adapted for use of the CRT monitor power control unit of the invention. As illustrated, the personal computer system includes a central unit 10 within a generally rectangular case 12, a CRT monitor 14 and peripheral input devices such as a keyboard 16 and a mouse 18. The central unit 10 commonly has a mother board (not illustrated) which has a plurality of slots in which are inserted circuit boards commonly referred to as cards. Such cards include disk drive controller cards, graphical interface cards, etc. Frequently these cards have I/O ports which are accessible through an opening 20 in the rear of the computer case 12. As illustrated, the available ports include a parallel port 22, a graphics port 24 which is connected by cable 26 to the CRT monitor 14; and one or more ports, such as 30, for connection to peripheral devices such as printers, plotters, etc. The central unit 10 also has a port 32 for the keyboard cable 34 which normally extends from the keyboard 16 to the computer unit 10. Electrical power is supplied to the central unit 10 of the computer with a conventional grounded electrical conductor 36 for AC voltage which is connected in a receptacle 38 at the rear of the computer. Commonly, the receptacle 38 is paired with a power on/off switch 40. Also at the rear of the computer is a fan 42 for circulating air to control the temperature within the computer case 12. The CRT monitor 14 has an electrical power supply through an electrical cable 44 which is commonly connected to a conventional wall outlet for supply of AC voltage to the CRT monitor 14.

The power control unit 46 of the invention is enclosed in a case or housing 48 which includes a plurality of connector receptacles. The control unit 46 has an electrical conductor 50 with a conventional grounded plug 52 for connection to a conventional AC power receptacle. The power control unit 46 also has a grounded receptacle 54 which receives the grounded electrical plug 56 of the electrical cable 44 of the CRT monitor 14.

The cable 34 from the keyboard 16 and the cable 58 from the mouse 18 are connected into appropriate receptacles of the power control unit. The power control unit 46 has an output terminal which is connected with cable 60 to the mouse port 62 of the computer unit 10, and an output terminal which is connected with cable 64 to the keyboard input port 32 of the computer.

The personal computer can be provided with other input peripheral devices. FIG. 2 illustrates a digitizing tablet 17 with a cursor 19. The tablet 17 commonly has a separate low voltage power supply (not shown) and a cable 21 which is connected to a serial port of the computer. In the application of this invention, the cable 21 is connected to an input terminal of the power control unit 46, rather than cable 58 from the mouse 18, and the output cable 60 from the power control unit 46 is connected to a serial port such as 30.

Another input peripheral device is a personal writing recognition tablet 31 which has an active area 33 and an output cable 35 for connection to a serial port of the computer. Cable 35 can be connected to an input terminal of the computer rather than cable 58 from the mouse 18 and connected to the computer by cable 60.

Not all input peripheral devices need to be connected to the computer through the power control unit of the invention. If the keyboard is always used in combination with another peripheral device, the power control unit needs only an input from the keyboard, and the other peripheral device can be connected directly to the computer. As an illustration, if keyboard selections are always necessary to select a function requiring input from the digitizing table, the table 17 can be directly connected to the computer. This would allow a different input peripheral device, such as mouse 18, or tablet 31 to be connected through, and monitored by, the power control unit 46.

Figure 5:
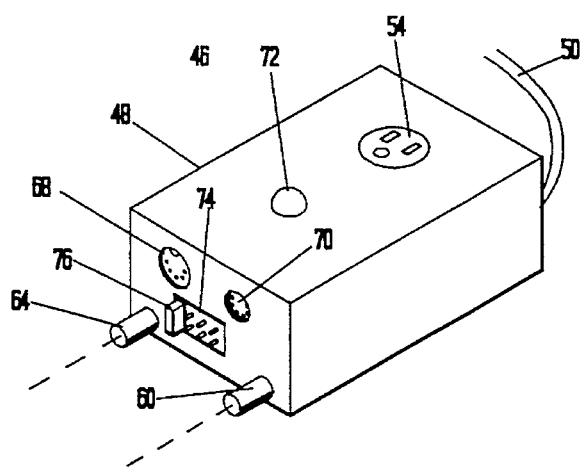
FIG. 5 is a perspective view of the power control unit of the invention.

Referring now to FIG. 5, the power control unit 46 is illustrated in a perspective view that shows the various input terminals and output cables. As illustrated, the power control housing 48 has a receptacle 68 for connection to a conventional personal computer keyboard cable 34 (see FIG. 1) and a receptacle 70 for connection to cable 58 from the mouse 18. Exiting from the power control unit housing are the connecting cables 60 and 64 which extend to the computer unit 10, described with regard to FIG. 1.

The power control unit 46 can also be provided with a visual indicator of activity, i.e., a visual indicator to permit observation of when the power supply to computer monitor has been interrupted by the power control unit. This is in the form of a light-emitting diode (LED) 72 on the upper surface of the power control unit housing 48. Additionally, the power control unit is provided with user variable time delays and for this purpose a conventional jumper switch 74 is provided in which the user can move a jumper 76 between selected pairs of terminals, thereby selecting variable time delays, e.g., 5, 10, or 20 minutes. This provides a variable delay in the interruption of the power supply to the monitor by the control unit following a sensing of inactivity of the computer.

Referring now to FIG. 4, the components of the power control unit 46 are illustrated in a block diagram. The unit has a clock generator circuit 78 which generates a square wave signal that is used to control the timing of the various succeeding components. A useful clock generator for this purpose is available as an integrated circuit under the designation LM 555. This clock circuit generates a signal with a TTL level from zero to five volts DC at a frequency of 0.213 Hz or, 4,687 seconds per cycle. This square wave is applied to the first half of a flip flop circuit (74LS74) to divide the frequency by two, resulting in a signal with a frequency of 0.106 Hz, or 9.375 seconds per cycle. The square wave signal of the predetermined frequency is applied to a timer circuit 80 which includes an 8-bit counter (74LS393) to produce a pulse signal every 32, 64 and 128 counts of the clock signal. These correspond to a pulse to every 5 minutes (32 counts times 9,375 seconds/count), 10 minutes (64 counts times 9,375 seconds/count), and 20 minutes (128 counts times 9.375 seconds/count), and the pulsed signals are applied to the terminals of a jumper switch 74. The jumper 74 is user selectable to provide a single output signal at one of the aforementioned, predetermined durations of the timer circuit, and the output signal is applied to the latch circuit 84. The latch circuit 84 is formed of the second half of 74LS74 integrated circuit and a pair of NAND gates available in an integrated circuit designated as 74LS00.

The power control unit 46 also includes an activity detector circuit 86 which includes a second pair of NAND gates to which is supplied the user activity input such as an input signal 89 from a keyboard or an input signal 90 from a mouse. The activity detector generates a pulse signal which is passed to the latch circuit 84 and to the timer circuit 80. The activity detector signal is applied to the timer circuit 80 to reset the registers in that circuit and start a new count.

The signal from the activity detector circuit 86 is also applied to the latch circuit 84 to disable the latch circuit 84 and close the zero crossing AC switch, restoring power to a monitor to which the power has been interrupted because of prior inactivity.

The latch circuit 84 is connected by a conventional zero crossing AC optical isolation switch (MOC3032/33) to the power switch 92 (Q2009F41-ND).

Figure 6:
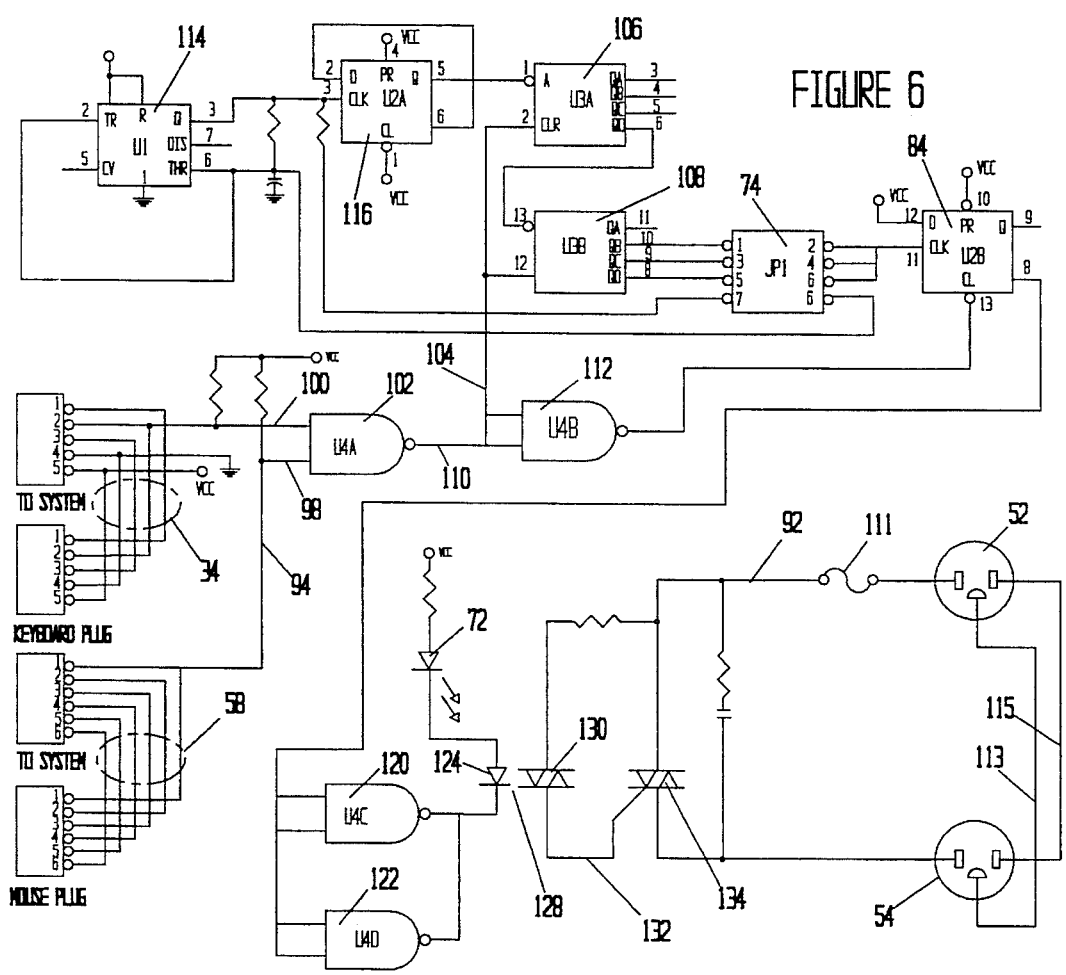
FIG. 6 is a schematic of the electrical circuit of the power control unit of the invention.

Referring now to FIG. 6, there is illustrated the circuit diagram for the power control unit of the invention. The inputs to the power control unit 46 comprise a conventional 5-conductor cable 64 to the keyboard receptacle 32, and a conventional 6-conductor cable 60 to the mouse receptacle 62 of the computer unit 10. The input receptacles 68 and 70 are connected directly to the output cables 34 and 58 and a single lead 94 and 96 from each receptacle is applied to the respective input terminals 98 and 100 of the first NAND gate 102. The output of NAND gate 102, is applied to the clear input terminal 104 of a pair of counters 106 and 108, and to terminal 110 of the second NAND gate 112.

The clock generator 114 provides a train of counts of preset frequency, i.e., 0.213 Hz, and this train of counts is applied to a timer circuit formed of flip flop 116 and counters 106 and 108. The outputs of the timer circuit 80 comprising signals with pulses every 32 counts, 64 counts or 128 counts on leads 10, 9 and 8, respectively, are applied to the jumper switch 74. The jumper permits user selection to connect a selected one of the aforementioned pulsed signals to the latch circuit 84 which is formed with the second half of the 74LS74 integrated circuit. The output of the latch circuit is applied to a second pair of NAND gates 120 and 122, the output of which is applied to the LED 124 of the optically isolated zero crossing triac driver 128. The LED 124 is in circuit with an LED 72 so that the LED 72 will provide a visual indication of the application of a latch signal to the zero crossing electrical switch circuit 92.

The digital control circuits of the power control unit are optically isolated from the electrical switch circuit 92 with an optical isolation switch 128 comprising a conventional circuit (MOC3032/33) that includes LED 124 and triac 130. The circuit through the triac is applied to the gate 132 of a second power triac 134 which serves as the AC power switch of the electrical control circuit 93. This circuit includes the receptacle 54 for the power supply cable to the CRT monitor 14 to supply 110 volt AC power to the monitor, and the power control unit supply, included electrical plug 52. The electrical switch circuit 93 is effective to turn the power supply through the triac on or off only when the voltage across the circuit reaches zero so that the power interruption or power restoration to the monitor only occurs at a zero crossing value of the supply of AC voltage.

The power control unit of this invention provides a substantial reduction in power requirements for a computer system. The typical CRT monitor consumes about 100 watts per hour which comprises from 40 to 60% of the total power requirements of the complete computer system. The control unit monitors all user input peripheral devices and interrupts the power supply to the CRT monitor when no activity is detected at the user input interface for a user selectable duration of, e.g., 5, 10 or 20 minutes. The control unit 46 restores electrical power to the CRT monitor immediately upon resumption of any user activity at the keyboard or mouse. The power control unit is totally transparent to the BIOS (Basic Input/Output Systems) operating system or any software applications used in the computer system and does not degrade or lose any data within the computer system. Since the typical computer, and monitor, is used for only 20% of the time that the computer system is on, the power control unit of this invention represents a very significant saving in power consumption. Further, since the power to the CRT monitor is interrupted during the major portion of the work day and is entirely shut off on weekends and evenings, the expected life of the monitor can be significantly increased. The longevity of the monitor is further enhanced by the precaution of the zero crossing electrical switch which avoids any disruptive power surges to the monitor which could cause internal damage.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. In a computer system having a base unit containing a central processing unit, a graphical interface having a graphics port, a plurality of I/O ports and an electrical power supply, and at least one user input peripheral unit in an input circuit to one of said I/O ports and a non-captive CRT monitor in circuit to said graphics port and having an independent electrical power supply, wherein the improvement consists of:

a. normally closed electrical switch means in said independent electrical power supply to, and external of, said CRT monitor;

b. timing means including clock means to generate a clock signal of counts of predetermined frequency, and counter means to produce a pulsed signal upon receipt of a pre-selected number of clock signal counts also external of said CRT monitor:

c. latch means also external of said CRT monitor and in circuit to apply an interrupt signal to said electrical switch means to open said switch means and interrupt said electrical power supply to said monitor, and first circuit means from said counter means to apply said pulsed signal to said latch means and generate said interrupt signal;

d. user activity detection means external of said CRT monitor, in said input circuit of said user input peripheral unit to generate an activity signal upon detection of an input signal from said peripheral unit; and e. second circuit means external of said CRT monitor from said user activity detection means to apply said activity signal to reset said counter means and to apply said activity signal to clear said latch means.

2. The computer system of claim 1 wherein said user input peripheral unit is a keyboard.

3. The computer system of claim 1 wherein said user input peripheral unit is a mouse.

4. The computer system of claim 1 wherein said user input peripheral unit is a digitizing tablet.

5. The computer system of claim 1 wherein said user input peripheral unit is a handwriting recognition tablet.

6. The computer system of claim 1 including two user input peripheral units with said user activity detection means in the respective input circuit of each of said input peripheral units.

7. The computer system of claim 6 wherein said two user input peripheral units are a keyboard and a mouse.

8. The computer system of claim 1 wherein said electrical switch means is a zero-crossing alternating current switch.

9. The computer system of claim 8 wherein said latch means is electrically isolated from said electrical switch means by an optical coupler switch.

10. A computer system comprising:

a. a base unit containing a central processing unit, a graphical interface having a graphics port, a plurality of I/O ports and an electrical power supply, and at least one user input peripheral unit in an input circuit to one of said I/O ports;

b. a non-captive CRT monitor in circuit to said graphics port and having a second electrical power supply independent of said base unit; and c. electrical power conserving means external of said CRT monitor and comprising:
   1) normally closed electrical switch means in circuit with said second electrical power supply;
   2) timing means including clock means to generate a clock signal of counts of predetermined frequency, and counter means to produce a pulsed signal upon receipt of a pre-selected number of clock signal counts;
   3) latch means in circuit to apply an interrupt signal to said electrical switch means to open said switch means and interrupt said second electrical power supply to said monitor, and first circuit means to apply pulsed signal to said latch means and generate said interrupt signal;
   4) user activity detection means in said input circuit of said user input peripheral unit to generate an activity signal upon receipt of an input signal from said peripheral unit; and
   5) second circuit means to apply said activity signal to said timing means and reset said counter means and to apply said activity signal to said latch means and clear said latch means.

11. The computer system of claim 10 wherein said user input peripheral unit is a keyboard.

12. The computer system of claim 10 wherein said user input peripheral unit is a mouse.

13. The computer system of claim 10 wherein said user input peripheral unit is a digitizing tablet.

14. The computer system of claim 10 wherein said user input peripheral unit is a handwriting recognition tablet.

15. The computer system of claim 10 including two user input peripheral units with said user activity detection means in the respective input circuit of each of said input peripheral units.

16. The computer system of claim 15 wherein said two user input peripheral units are a keyboard and a mouse.

17. The computer system of claim 10 wherein said electrical switch means is a zero-crossing alternating current switch.

18. The computer system of claim 17 wherein said latch means is electrically isolated from said electrical switch means by an optical coupler switch.

* * * * *